(12) United States Patent
Filipowicz et al.

(10) Patent No.: US 11,721,139 B2
(45) Date of Patent: Aug. 8, 2023

(54) ELECTRIC VEHICLE SIMULATION

(71) Applicant: Toyota Research Institute, Inc., Los Altos, CA (US)

(72) Inventors: Alexandre Filipowicz, Mountain View, CA (US); David Ayman Shamma, San Francisco, CA (US); Nikos Arechiga Gonzalez, San Mateo, CA (US); Matthew L. Lee, Mountain View, CA (US); Scott Carter, San Jose, CA (US)

(73) Assignee: Toyota Research Institute, Inc., Lost Altos, CA (US)

( * ) Notice: Subject to any disclaimer, the term of this patent is extended or adjusted under 35 U.S.C. 154(b) by 0 days.

(21) Appl. No.: 17/715,548

(22) Filed: Apr. 7, 2022

(65) Prior Publication Data
US 2023/0215225 A1    Jul. 6, 2023

Related U.S. Application Data

(60) Provisional application No. 63/295,116, filed on Dec. 30, 2021.

(51) Int. Cl.
| | | |
|---|---|---|
| *G07C 5/04* | (2006.01) | |
| *G01C 21/36* | (2006.01) | |
| *B60R 16/023* | (2006.01) | |
| *G06Q 30/0601* | (2023.01) | |

(52) U.S. Cl.
CPC .............. *G07C 5/04* (2013.01); *B60R 16/023* (2013.01); *B60R 16/0231* (2013.01); *G01C 21/3697* (2013.01); *G06Q 30/0631* (2013.01)

(58) Field of Classification Search
CPC .. G07C 5/04; G01C 21/3697; B60R 16/0231; B60R 16/023; G06Q 30/0631

USPC ......................................................... 701/109
See application file for complete search history.

(56) References Cited

U.S. PATENT DOCUMENTS

| | | | | |
|---|---|---|---|---|
| 2014/0129080 A1* | 5/2014 | Leibowitz | ........... | B60R 16/0231 |
| | | | | 705/26.7 |
| 2015/0142262 A1* | 5/2015 | Lee | ......................... | G06F 30/20 |
| | | | | 701/36 |

FOREIGN PATENT DOCUMENTS

| | | | |
|---|---|---|---|
| CN | 104980470 A | * | 10/2015 |
| JP | 2001078304 A | * | 3/2001 |

OTHER PUBLICATIONS

Unknown, "Z. E. Explore for Android—APK Download," May 28, 2019, 4 pages, found at https://m.apkpure.com/z-e-explore/com.renault.renaultze.

Rolandas Juteika, "EV: electric car costs & range," Analyze & compare EV vs ICEV, 2021, 3 pages, found at https://apps.apple.com/us/app/ev-electric-car-costs-range/id1594084399.

(Continued)

*Primary Examiner* — Mahmoud Gimie
(74) *Attorney, Agent, or Firm* — Christopher G. Darrow; Darrow Mustafa PC

(57) ABSTRACT

Systems, methods, and other embodiments described herein relate to informing a user how a hypothetical electric vehicle would perform based on the driving habits of the user in a non-electric vehicle. In one embodiment, a method includes identifying an origin and a destination of a non-electric vehicle after the non-electric vehicle has arrived at the destination. The method includes determining energy information for a hypothetical electric vehicle traveling from the origin to the destination and outputting the energy information to the user.

20 Claims, 6 Drawing Sheets

(56) References Cited

OTHER PUBLICATIONS

Unknown, "Plan your routes with an electric vehicle efficiently with Eurocharging," last accessed on Mar. 22, 2022, 8 pages, https://www.eurocharging.eu/en/e-landing.
Unknown, "Intelligent Assistant for Electric Driving: the Audi e-tron Route Planner," Audi TechFocus, Oct. 23, 2020, pp. 1-4.
Unknown, "A Better Routeplanner (ABRP) on the App Store," Iternio Planning AB, 3 pages, last accessed Mar. 22, 2022, found at https://apps.apple.com/us/app/a-better-routeplanner-abrp/id1490860521.
Unknown, "PlugShare EV Trip Planner—Best Tesla Trip Planning App," last accessed on Mar. 22, 2022, 4 pages, found at https://www.plugshare.com/trip-planner.html.
Unknown, "5 Must-Have Apps when You're Going Electric," Renault Group, Jun. 22, 2018, 6 pages, found at https://www.renaultgroup.com/en/news-on-air/news/5-must-have-apps-when-youre-going-electric/.

\* cited by examiner

ELECTRIC VEHICLE SIMULATION

CROSS-REFERENCE TO RELATED APPLICATIONS/INCORPORATION BY REFERENCE

This patent application makes reference to, claims priority to, and claims benefit from U.S. Provisional Application Ser. No. 63/295,116, titled "Personalized Counterfactual Dashboard for Illustrating Hypothetical EV Ownership" filed on Dec. 30, 2021; which is hereby incorporated herein by reference in its entirety.

TECHNICAL FIELD

The subject matter described herein relates, in general, to systems and methods for informing a user how an electric vehicle may perform based on the driving habits of the user in a non-electric vehicle.

BACKGROUND

Adopting electric vehicles such as battery-only vehicles and plug-in hybrid vehicles is an important step towards achieving climate change management goals. However, issues such as range anxiety, which is an electric vehicle user's fear that the electric vehicle may not have enough energy (fuel and/or electric) to cover a certain distance, have limited the adoption of electric vehicles. Additionally, potential users of electric vehicles may be unfamiliar with how an electric vehicle would fit into their lifestyle and may be hesitant to purchase an electric vehicle prior to gaining that familiarity.

SUMMARY

In one embodiment, a method for informing a user how an electric vehicle may perform based on the driving habits of the user in a non-electric vehicle is disclosed. The method includes identifying an origin and a destination of a non-electric vehicle after the non-electric vehicle has arrived at the destination. The method also includes determining energy information for a hypothetical electric vehicle traveling from the origin to the destination and outputting the energy information to the user.

In another embodiment, a system for informing a user how an electric vehicle may perform based on the driving habits of the user in a non-electric vehicle is disclosed. The system includes one or more processors, and a memory in communication with the one or more processors. The memory stores a control module including instructions that when executed by the one or more processors cause the one or more processors to identify an origin and a destination of a non-electric vehicle after the non-electric vehicle has arrived at the destination and determine energy information for a hypothetical electric vehicle traveling from the origin to the destination. The memory stores an output module including instructions that when executed by the one or more processors cause the one or more processors to output the energy information to the user.

In another embodiment, a non-transitory computer-readable medium for informing a user how an electric vehicle may perform based on the driving habits of the user in a non-electric vehicle and including instructions that when executed by one or more processors cause the one or more processors to perform one or more functions, is disclosed. The instructions include instructions to identify an origin and a destination of a non-electric vehicle after the non-electric vehicle has arrived at the destination. The instructions further include instructions to determine energy information for a hypothetical electric vehicle traveling from the origin to the destination. The instructions further include instructions to output the energy information to a user.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
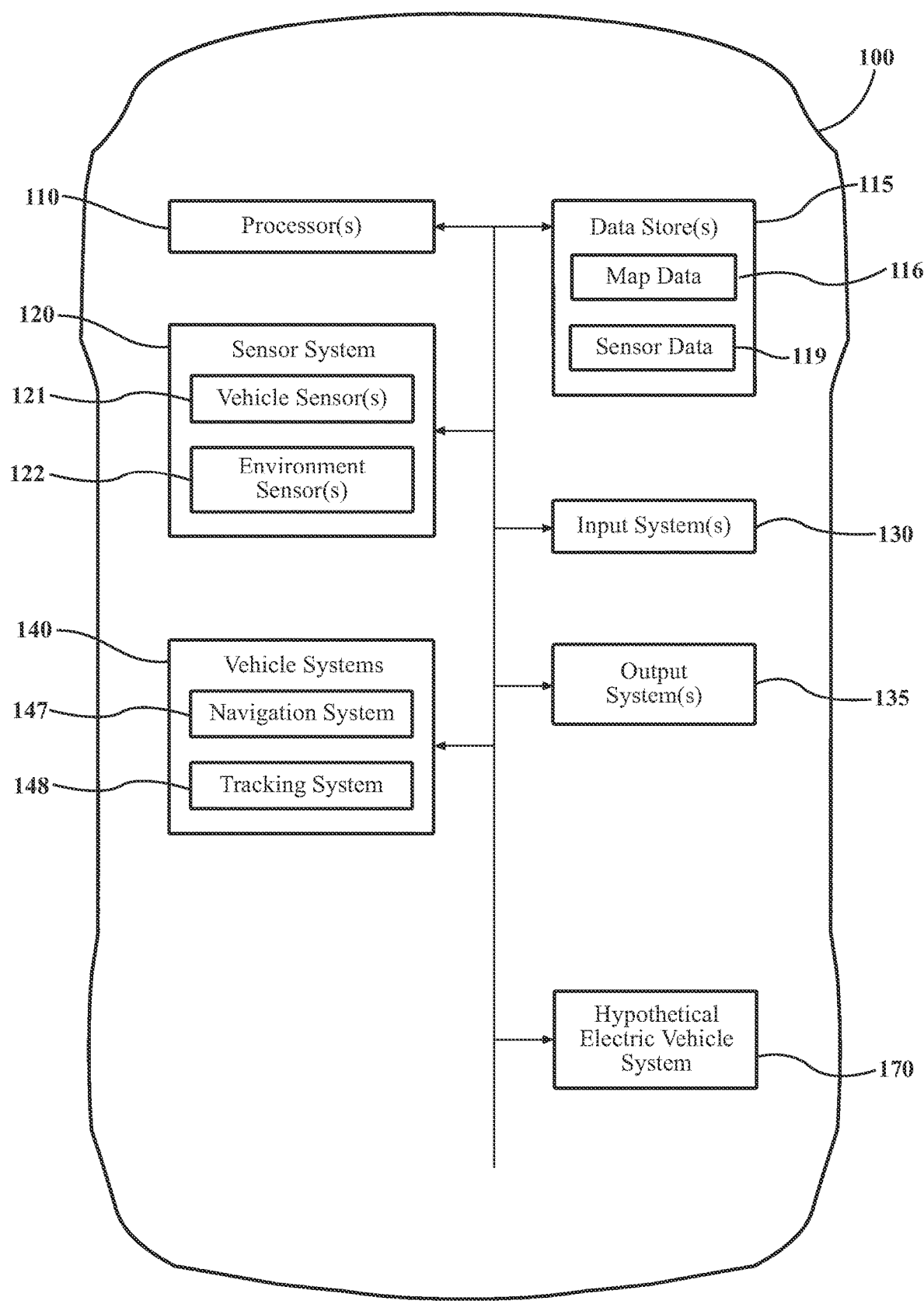
FIG. 1 illustrates a block diagram of a vehicle incorporating a hypothetical electric vehicle system.

Systems, methods, and other embodiments associated with informing a user how an electric vehicle may perform based on the driving habits of the user in a non-electric vehicle are disclosed. The adoption of electric vehicles such as battery-only vehicles and plug-in hybrid vehicles will be a significant contributor to meeting climate change targets. However, due to an unfamiliarity with electric vehicle (EV) technology, potential users and purchasers may be hesitant to use and/or purchase EVs. Potential purchasers may have various questions that cannot be answered by a short (one hour or less) test drive. Potential purchasers may want to know how the EV would fit in their lifestyle before they purchase the EV. They may need assistance identifying the EV that would be suitable for them. They may need to be educated or at least, informed of the difference in environmental impact between a non-electric vehicle travel and an electric vehicle travel. Further, the user may require assistance in identifying charging stations and/or suitable routes for EV travel.

Users may need assistance understanding how their driving patterns would be affected, if affected, when driving an EV. Users may need assistance identifying charging stations/locations, estimating their EV driving range requirements, their running costs such as charging costs, their operating costs such as maintenance costs, and the environmental impact of driving an EV.

Accordingly, in one embodiment, the disclosed approach is a system that informs a user how an EV may perform based on the driving habits of the user in a non-electric vehicle. The system may monitor the travel patterns of the non-electric vehicle for any suitable time period such as a week, a day, a month, six months or a year.

The system may be an application available on a mobile device and/or in a vehicle. The system monitors the user's driving in their current vehicle and provides counterfactual information, indicating how the user's driving may be in an EV. The information may include charging locations as well as the cost savings and the reduction in carbon emissions between EV travel and non-electric vehicle travel. The system may also provide a research platform for testing intervention methods for informing about and/or encouraging EVs using rule-based and/or machine learning notification delivery.

Using the system, the user can gain familiarity with EVs and understand how an EV would fit into their lifestyle. The system can assist the user in identifying the user's driving habits and further identifying the EV type that is suitable to meet the user's needs. As a research platform, the system may be used to test the efficacy of interventions and/or interactions with a user by, as an example, identifying frequently visited locations and updating the user using real-time in-situ information about charging locations, carbon emissions, and/or residual range or state of charge (SOC) by the end of the day.

The system can be on a mobile device. Additionally and/or alternatively, the system may be located or installed in a vehicle. The system may communicate with the user using a visual display and/or an audible format. As an example, the system may include multiple tab panes as shown in FIGS. 4B-4E. The vehicle may be non-electric vehicle or may be an electric vehicle that differs from the EVs being characterized within the system. This may be useful in providing the user with insight into how an EV that differs from their current EV would fit in with their lifestyle.

As an example, the system may select one or more EVs to characterize and present to the user. In this example, the system may select EVs that share similar features with the user's current vehicle. Features such as number of passenger seats, cargo space, ground clearance, and/or time required to accelerate from 0-60 mph.

As an example, at the beginning of the day, assuming that the hypothetical electric vehicle (EV) charged throughout the night, the system can set the hypothetical EV to a charge of 80 percent. The system can reduce the remaining charge throughout as the vehicle travels from one destination to the next. The system can increase the charge when the vehicle is proximate to a charging location.

After the vehicle leaves an origin and arrives at a destination, the system can identify the origin and the destination, as detailed below. The system can identify route(s) from the origin to the destination, charging location(s) along the routes, the time and distance for an EV to travel from the origin to the destination. The time and distance may include time spent at a charging location and the distance of the detour from the road to and from the charging location.

As another example, the system may identify charging locations proximate to the vehicle and may notify the user. In such an example, the system may indicate to the user that there are charging locations proximate to the vehicle, and the system may automatically update the charge of the hypothetical EV based on the time period the vehicle remained parked. Additionally and/or alternatively, the system may inquire whether the user would like the hypothetical EV to be charged, and in response to the user's input, update the charge of the hypothetical EV.

As another example, the system may determine when the vehicle has been parked for the night and that the vehicle has reached a final destination for the night. Upon determining such, the system may determine and output to the user information such as the remaining charge, and action reminders, such as "plug in the vehicle before leaving."

The system may include determining when to communicate with a user so as to remain an effective intervention and not become a nuisance. The system may utilize machine learning methods and historical information to determine the optimal frequency and/or the appropriate triggers for communicating with the user.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, a block diagram of a vehicle 100 incorporating a hypothetical electric vehicle (EV) system 170 is illustrated. As used herein, "vehicle" means any form of motorized transport. In one or more implementations, the vehicle can be an automobile. While arrangements will be described herein with respect to automobiles, it will be understood that embodiments are not limited to automobiles. The vehicle can be any other type of vehicle that may be used on a roadway, such as a motorcycle. In some implementations, the vehicle 100 may be a non-electric vehicle. Alternatively, the vehicle 100 may be an electric vehicle. In such a case, the vehicle 100 may have different characteristics from the hypothetical EV. In some implementation, the vehicle can be a watercraft, an aircraft, or any other form of motorized transport.

The vehicle 100 includes various elements. It will be understood that in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment.

Some of the possible elements of the vehicle 100 are shown in FIG. 1 and will be described along with subsequent figures. However, a description of many of the elements in FIG. 1 will be provided after the discussion of FIGS. 2-4 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes a hypothetical EV system 170 that is implemented to perform methods and other functions as disclosed herein relating to informing a user how an electric vehicle may perform based on the driving habits of the user in a non-electric vehicle. As will be discussed in greater detail subsequently, the hypothetical EV system 170, in various embodiments, may be implemented partially within the vehicle 100 and may further exchange communications with additional aspects of the hypothetical EV system 170 that are remote from the vehicle 100 in support of the disclosed functions. Thus, while FIG. 1 generally illustrates the hypothetical EV system 170 as being self-contained, in various embodiments, the hypothetical EV system 170 may be implemented within multiple separate devices some of which may be remote from the vehicle 100.

Figure 2:
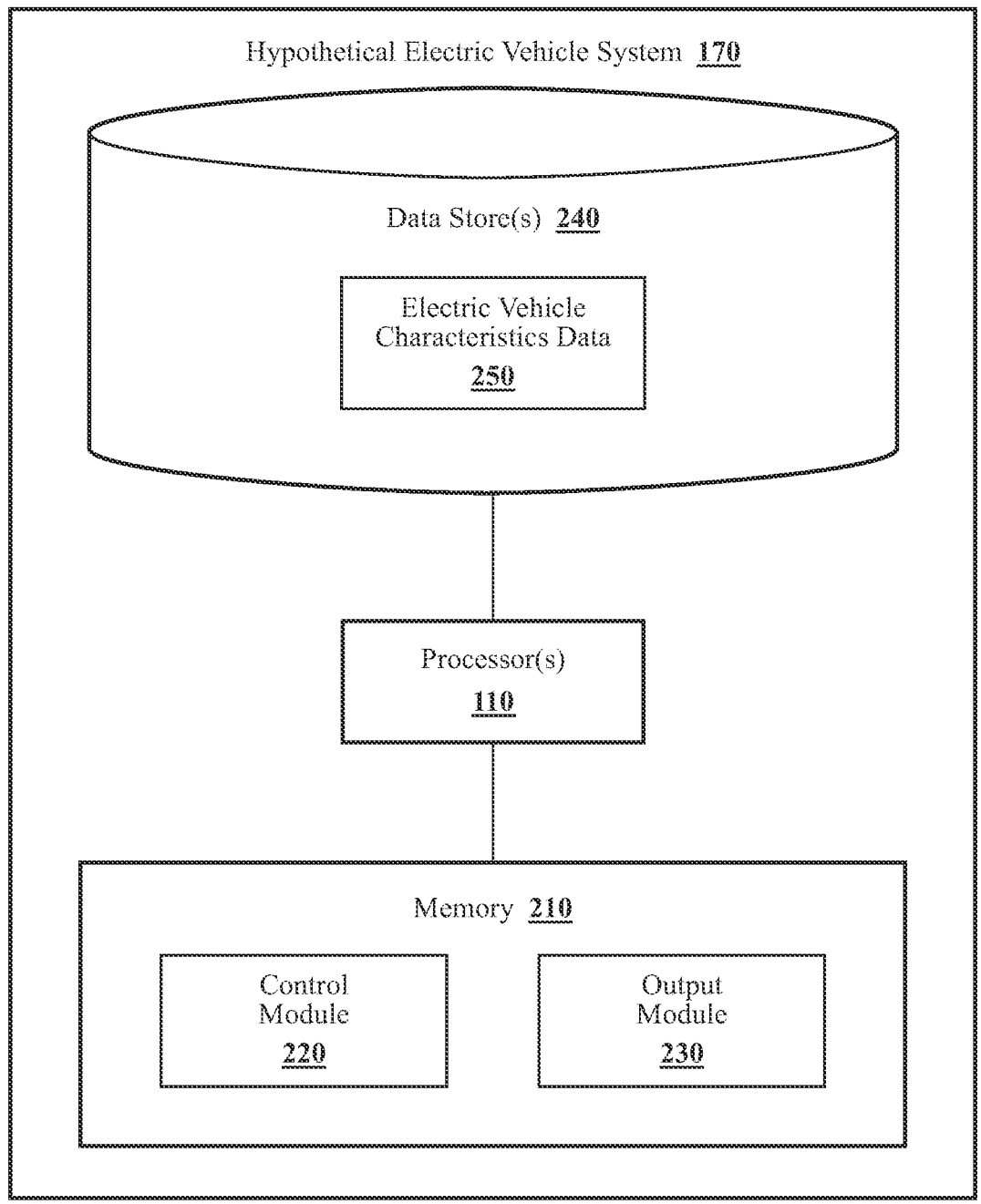
FIG. 2 illustrates one embodiment of the hypothetical electric vehicle system.

With reference to FIG. 2, one embodiment of the hypothetical EV system 170 of FIG. 1 is further illustrated. The hypothetical EV system 170 is shown as including a processor 110 from the vehicle 100 of FIG. 1. Accordingly, the processor 110 may be a part of the hypothetical EV system 170, the hypothetical EV system 170 may include a separate processor from the processor 110 of the vehicle 100, and/or the hypothetical EV system 170 may access the processor 110 through a data bus or another communication path. In further aspects, the processor 110 is a cloud-based resource that communicates with the hypothetical EV system 170 through a communication network.

In one embodiment, the hypothetical EV system 170 includes a memory 210 that stores a control module 220 and an output module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions within the physical memory 210 that when executed by the processor 110 cause the processor 110 to perform the various functions disclosed herein.

In one embodiment, the hypothetical EV system 170 includes a data store 240. The data store 240 is, in one embodiment, an electronic data structure (e.g., a database) stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes electric vehicle characteristics data 250 and or other information that is used by the modules 220 and 230. The electric vehicle characteristics data 250 may contain characteristics of the electric vehicle(s) the hypothetical EV system is comparing the vehicle to. The electric vehicle characteristics data 250 may include a vehicle brand and model, as well as any other relevant information about the electric vehicle(s) being compared.

In one embodiment, the control module 220 includes instructions that function to control the processor 110 to identify an origin and a destination of a non-electric vehicle 100 after the non-electric vehicle 100 has arrived at the destination. In this context, an origin is a location that the vehicle 100 is travelling from or starting a journey from, and a destination is a location the vehicle 100 is travelling to or ending the journey. In one or more embodiments, the control module 220 may listen to events occurring within the vehicle systems 140 such as the navigation system 147 and the tracking system 148 to determine locations that the vehicle 100 has travelled to and from. Additionally and/or alternatively, the control module 220 can listen or communicate with any suitable device that is capable of determining geographic location, altitude, speed, and orientation. The device can identify a location, an origin, and/or a destination, after the vehicle visits the location. Such a device may utilize applications such as Core Location and Core Motion libraries in an iOS operating system and/or similar location-aware applications in an Android operating system. Such devices may be capable of distinguishing between a vehicle that is stopped at a traffic light and a vehicle that is parked at an origin and/or a destination. As an example, the device may determine that when the vehicle is stationary for less than a threshold period (e.g., an average traffic light cycle of 120 seconds), the location of the vehicle is neither an origin nor a destination. Further, the device may determine that when the vehicle is stationary for over a threshold period such as ten minutes, the location is an origin and/or a destination. The control module 220 may also determine that a location is an origin and/or destination based on historical information, user input, and/or recognizing Wi-Fi and/or Bluetooth network connections. As an example, the control module 220 determines that the vehicle is at the destination when the control module 220 recognizes that the vehicle is within the range of the Wi-Fi network at the user's home or the user's place of work. The control module 220 may determine that the destination is the final destination for a day using a suitable algorithm. As an example, the control module 220 may use machine learning techniques that monitor the user's driving habits such as the location where the vehicle is most frequently parked at nighttime, e.g., by midnight. As another example, the control module 220 determines the destination is the final destination when the control module recognizes the Wi-Fi network as the user's home Wi-Fi network.

The control module 220 can receive the locations that the vehicle has travelled to in the order in which the vehicle travelled to the locations. Further, the control module 220 may receive the locations in order and the locations may be accompanied by timestamps. As such in the case of two locations, one having an earlier timestamp and the other having a later timestamp, the control module 220 may identify the location with the earlier timestamp as the origin and the location with the later time stamp as the destination. As another example and in a case where the vehicle made multiple location stops, e.g., five location stops, the control module 220 may identify the first of the five location stops as the origin and the fifth of the five location stops as the destination. As another example, the control module 220 may identify the first location stop as the first origin and the second location stop as the first destination, the second location stop as the second origin and the third location stop as the second destination, the third location stop as the third origin, and the fourth location stop as the third destination, and so on.

The control module 220 can determine one or more routes suitable for the hypothetical EV to travel from the origin to the destination. In such a case, the control module 220 can receive the routes from a device capable of generating one or more routes between the origin and the destination, estimating the distance for the one or more routes, and estimating the duration for the one or more routes. As an example, the control module 220 may receive the routes, distances, and duration from the vehicle systems 140 such as the navigation system 147 and/or the tracking system 148. Additionally and/or alternatively, the control module 220 can receive the routes, the estimated distances, and the estimated duration from a mapping Application Programming Interface (API) such as Google Maps, Apple Maps, and Amazon Web Services (AWS) Mappings API, and/or an electric vehicle route planning API such as Iternio. The control module 220 may request and receive from the vehicle systems 140, the mapping API, and/or the electric vehicle route planning API, and information about the charging station(s) along the generated routes. The information may include the location of the charging station(s), the charging costs, the charging rate, and/or the charging time.

Upon receiving the routes, the control module 220 may determine whether any of the routes are unsuitable for the hypothetical EV. As an example, the control module 220 may determine the amount of electric charge the hypothetical EV presently has, the amount of electric charge the hypothetical EV may need to travel from the origin to the destination, and whether there are any charging stations along the route. In a case where the control module 220 determines that the electric charge needed to travel from the origin to the destination exceeds the electric charge the hypothetical EV presently has and there are no charging stations along the route, the control module may deem the route unsuitable for the hypothetical EV. The control module may retain the routes that are deemed suitable for the hypothetical EV.

The control module 220 may determine energy information for a hypothetical EV traveling from the origin to the destination. Additionally, the control module 220 may determine the energy information for the hypothetical EV traveling from the origin to the destination on one or more routes. The control module 220 may determine the energy information for a single hypothetical EV and/or multiple hypothetical EVs. The control module 220 may receive the characteristics of the hypothetical EV(s) via user input into an input system 130 that is accessible to the control module 220. As an example, the user may input the vehicle brand and model. Alternatively, the user may input preferred characteristics such as range-per-charge, and the control module 220 may scan through a database of electric vehicles, to determine which electric vehicles have characteristics matching the preferred characteristics. The control module 220 may then select the electric vehicle(s) based on the user input. Additionally and/or alternatively, the control module 220 may select the electric vehicle(s) in any suitable manner. As an example, the control module 220 may select the most popular electric vehicle, the top five most popular electric vehicles, a group of small-sized electric vehicles, a group of electric SUVs, a group of electric mini-vans, a mixed group of small, medium, and large electric vehicles, or a group of electric vehicles within a certain price range. As another example, the control module 220 may select electric vehicles that have similarities to the non-electric vehicle 100 being driven by the user. In such an example, the similarities may include the number of passengers that the vehicles can carry, and/or the type of vehicle (e.g., sedan, SUV, minivan, truck). The control module 220 may store and retrieve information about the electric vehicle(s) in and from the electric vehicle characteristics data.

The control module 220 may determine energy information about the hypothetical EV(s) by, as an example, accessing a database that includes information about the different electric vehicle brands and models and retrieving the information that matches the selected electric vehicle(s). The energy information may include characteristics of the EV such as acceleration, range, energy consumption (watt hour per mile or watt hour per km), maximum speed, and/or towing weight. The control module can communicate or utilize an electric vehicle route planning API to determine energy information after the vehicle has arrived at the destination. As an example, the control module 220 may query the electric vehicle route planning API about the suitable EV routes and the state of charge (SOC) at the destination for the suitable EV routes.

The energy information may include an electric charge consumption amount, a remaining electric charge amount, a monetary amount, a carbon emission amount, a charging location, a distance, a route, or a travel time. The electric charge consumption amount refers to the amount of electric charge that the hypothetical EV would expend. As an example, the control module 220 may estimate the electric charge consumption amount by querying the electric vehicle route planning API for the amount of electric charge that the hypothetical EV would expend based on the brand and model of the hypothetical EV and the route. Additionally and/or alternatively, the control module 220 may calculate an estimate of the electric charge that the hypothetical EV would expend using a calculation based on at least, the energy consumption per mile and the number of miles between the origin and the destination along the route(s).

The remaining electric charge amount is also known as the state of charge (SOC). The remaining electric charge refers to the amount of electric charge left in the hypothetical EV. The control module 220 may determine the remaining charge amount by querying the EV routing planning API for the SOC. Additionally and alternatively, the control module 220 may determine the SOC using a calculation based on at least, the SOC at the origin and the electric charge the hypothetical EV expended travelling from the origin to the destination.

The monetary amount may include the cost of the electric charge the hypothetical EV expended travelling from the origin to the destination, a cost difference between the amount of gasoline expended by a non-electric vehicle 100 and the amount of electric energy expended by the hypothetical EV when travelling from the origin to the destination, and/or the cost to charge the hypothetical EV to a certain percentage (e.g., cost of charging the hypothetical EV to 50%, 80%, or 100%). The control module 220 may determine the cost of the electric charge by querying the EV routing planning API. Additionally and/or alternatively, the control module 220 may determine the monetary amount by using a calculation based on at least, the electric charge the hypothetical EV expended travelling from the origin to the destination, the amount of gasoline the vehicle 100 expended travelling from the origin to the destination, the electric charging rates, and/or the gasoline charging rates.

The control module 220 may determine the carbon emission amount by, as an example, accessing a database such as is available from the United States Environment Protection Agency (EPA). The control module 220 may query for and receive the carbon emission amount related to the hypothetical EV travelling from the origin to the destination from the EV route planning API.

The charging locations may include charging locations proximate to the vehicle 100 and/or charging locations along a generated route. The control module 220 may receive the charging locations from any suitable APIs including mapping and/or route planning APIs. Similarly, the control module 220 may receive the route(s), related distance(s), and travel time(s) from any suitable APIs. On the route(s) that have charging stations, the API may include a charging stop during the trip from the origin to the destination. In such a case, the API calculates the distance to include the distance from the road to the charging station and from the charging station back to the road. The API calculates the travel time to include the time spent charging the hypothetical EV at the charging station.

Upon determining that the vehicle 100 is at the destination using methods described above, the control module 220 may query the API(s) about whether there are any charging stations proximate to the destination and/or the vehicle 100. In response, the control module 220 may receive information about any proximate charging stations from the API(s). As an example, the control module 220 may automatically charge the hypothetical EV when the vehicle 100 is proximate to a charging station. As another example, the control module 220 may interact with the user using as an example, the input system 130, and query the user whether to charge the hypothetical EV while the vehicle 100 is at the destination. The control module 220 may then update the electric charge or SOC of the hypothetical EV to include the electric charge obtained at the proximate charging station. The control module 220 may determine the amount of electric charge obtained based on the time that the vehicle 100 spent at the destination. As an example, the control module 220 may determine the electric charge or SOC based on the rate at which the hypothetical EV charges and the amount of time the vehicle 100 was parked at the destination.

The output module 230 outputs the energy information to a user. The output module may output the energy information in any suitable manner such as using the output system 135. As an example, the output module 230 may output the energy information in a visual and/or audible manner. In such an example, the output module 230 may output the energy information to a display visible to the user, such as an in-vehicle display and/or a mobile device display. The output module 230 may output the energy information verbally through a speaker. As another example, the output module 230 may transmit the energy information to a server and/or a third party.

The output module 230 may determine a notification criteria and output the energy information according to the notification criteria. The notification criteria may be, in one example, a user defined preference indicating when and what information is to be provided to the user. As an example of the notification criteria, the output module 230 may receive user input indicating when the user prefers to be updated about the energy information for the hypothetical EV. The user input may indicate that the user prefers to be updated, as an example, at the end of each trip in a day, once a day at a specific time, once a week, when the user requests an update, or when the vehicle 100 is proximate to a location such as a charging station, the user's home or office.

The output module 230 may be automatically set using a rule-based system such as providing updated outputs once a day, once a week, at the end of the day, upon request from the user, upon arriving at a specific location. Additionally and/or alternatively, the output module 230 may utilize any suitable machine learning algorithm to determine an acceptable rule or frequency for updating the user. The output module 230 may consider historical information such as how often the user has interacted with the hypothetical EV system 170. The output module 230 may consider popular notification rates based on popularity amongst users in general. As previously mentioned, the output module 230 may output the energy information to the user on a schedule based on the notification criteria.

The control module 220 may determine that the destination is a final destination for a day using methods disclosed above. Upon the control module 220 determining that the destination is the final destination for the day, the output module 230 may output energy information about the hypothetical EV such as the remaining electric charge or SOC. As an example, the output module 230 may output a summary that includes the electric charge expended throughout the day, a total distance travelled and/or a total time spent travelling during the day. The output module 230 may output interactive information. As an example, the output module may wait to receive an input from the user, indicating that the user has plugged in the hypothetical EV to be charged. In a case where the output module 230 does not receive the input and a predetermined time period has passed, the output module 230 may output to the user a reminder to plug in the hypothetical EV.

The control module may set the state of charge of the hypothetical EV to a maximum at a set time and/or at a set location. As an example, the control module may set the state of charge of the hypothetical EV to the maximum setting at 7:00 am and/or when the vehicle is parked at the user's home.

Figure 3:
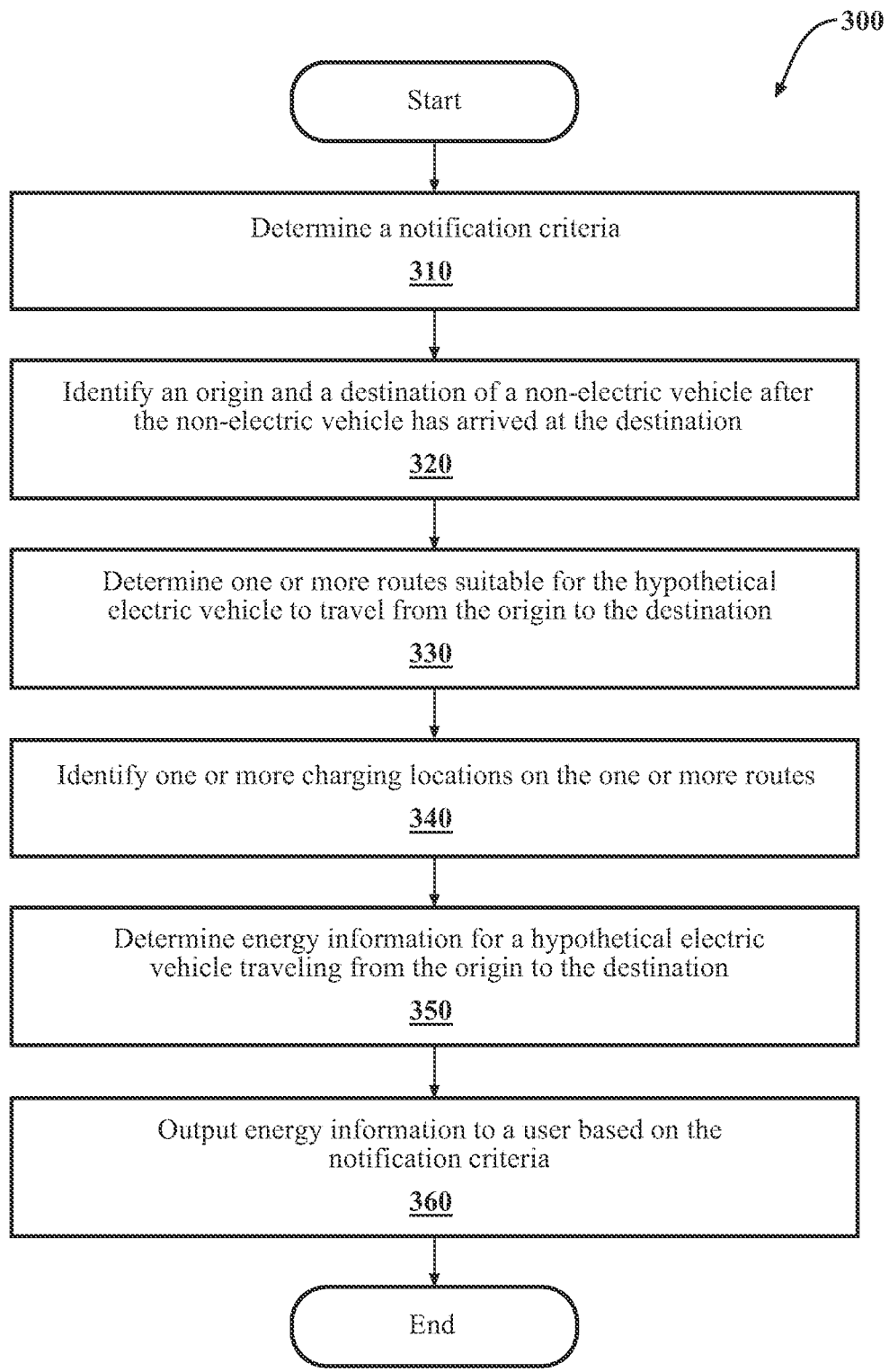
FIG. 3 is a flowchart illustrating one embodiment of a method associated with informing a user how an electric vehicle may perform based on the driving habits of the user in a non-electric vehicle.

FIG. 3 illustrates a method 300 for informing a user how an electric vehicle may perform based on the driving habits of the user in a non-electric vehicle 100. The method 300 will be described from the viewpoint of the vehicle 100 of FIG. 1 and the hypothetical EV system 170 of FIG. 2. However, the method 300 may be adapted to be executed in any one of several different situations and not necessarily by the vehicle 100 of FIG. 1 and/or the hypothetical EV system 170 of FIG. 2.

At step 310, the output module 230 may cause the processor(s) 110 to determine a notification criteria. As previously mentioned, the output module 230 may employ any suitable techniques to determine the notification criteria.

At step 320, the control module 220 may cause the processor(s) 110 to identify an origin and a destination of a non-electric vehicle after the non-electric vehicle has arrived at the destination, as discussed above. The control module 220 may further determine that the destination is the final destination for a day.

At step 330, the control module 220 may cause the processor(s) 110 to determine one or more routes suitable for the hypothetical EV to travel from the origin to the destination.

At step 340, the control module 220 may cause the processor(s) 110 to identify one or more charging locations on the one or more routes. The control module 220 may use any suitable algorithm or mapping application, as previously discussed, to identify the charging locations one the route(s).

At step 350, the control module 220 may cause the processor(s) 110 to determine energy information for a hypothetical EV traveling from the origin to the destination. The control module 220 may determine energy information based on the routes and the charging stations along the route(s), as previously discussed.

At step 360, the output module 230 may cause the processor(s) 110 to output the energy information to the user. The output module may output the energy information in a visual format, an audible format, or any other suitable format. The output module 230 may output the energy information to the user based on the notification criteria as discussed above.

A non-limiting example of the operation of the Hypothetical EV system 170 and/or one or more of the methods will now be described in relation to FIGS. 4A-4E. FIGS. 4A-4E show an example of a hypothetical EV scenario 400.

Figure 4A:
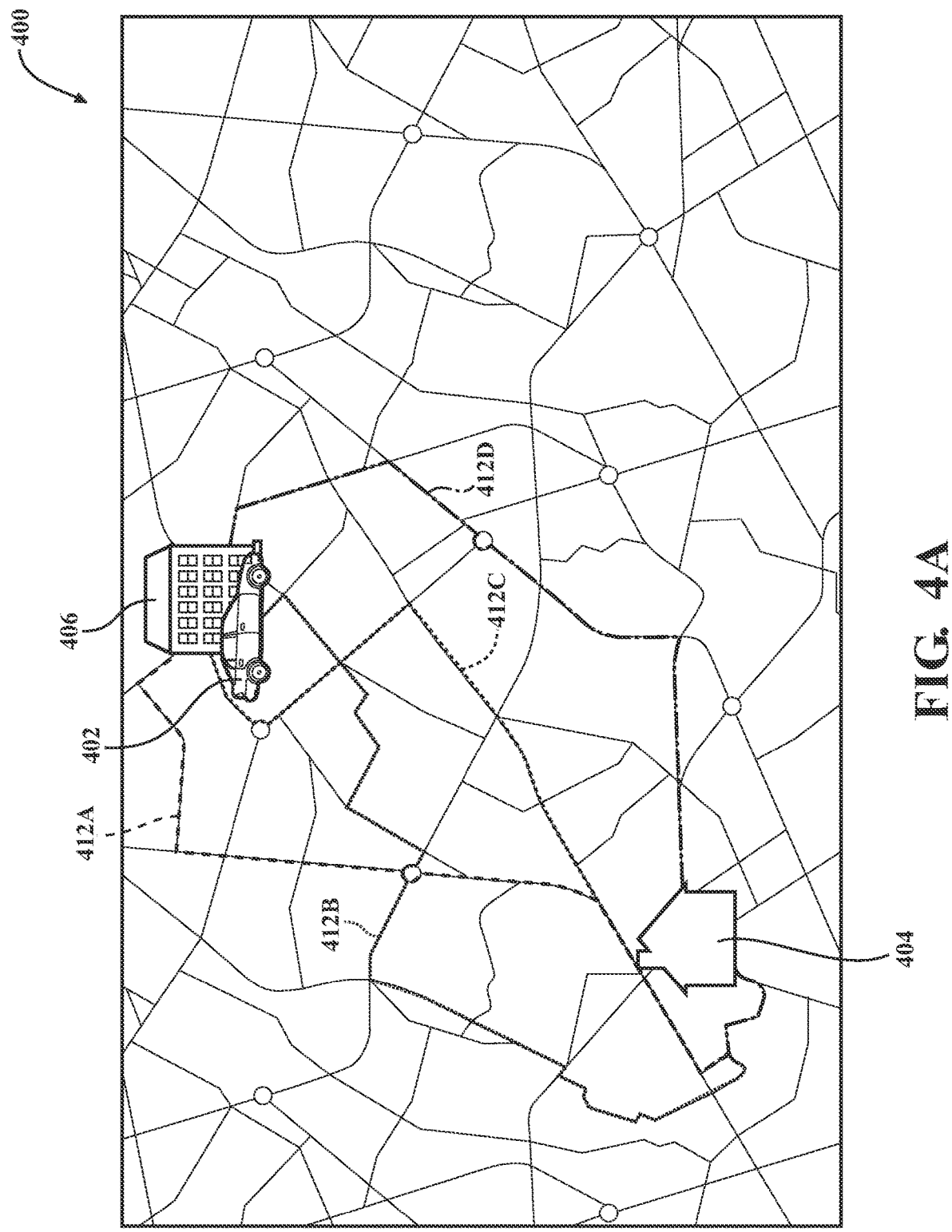
FIGS. 4A-4E is an example of a hypothetical electric vehicle information scenario.

In FIG. 4A, the vehicle 402, which is similar to vehicle 100, has traveled from the user's home 404 and is presently at the user's office 406. FIGS. 4B-4E show a display screen outputting energy information for the user.

The hypothetical EV system 170, or more specifically, the control module 220 may set the SOC of a hypothetical vehicle to, as an example, a 90% charge at the beginning of the day. The control module 220 may then query a mapping application to determine whether the vehicle 402 is at a destination. The control module 220 may query the mapping application based on any suitable trigger such as once an hour, when the vehicle 402 is started, and/or when the vehicle 402 appears to be stationary. The mapping application may determine that the vehicle 402 is stationary and has been stationary for a period of time such as more than ten minutes, indicating that the vehicle 402 is parked at a destination.

The control module 220 may query the mapping application for a list of the locations that the vehicle 402 has travelled to for that day. In response, the control module 220 may receive that the vehicle 402 was at the user's home 404 at 9:00 a.m. and currently, at 10:00 a.m., the vehicle 402 is at the user's office 406. The control module 220 can determine based on the timestamp that the user's home 404 is the origin of the trip and the user's office 406 is the destination of the trip.

The control module 220 may query from the mapping application possible routes from the user's home 404 to the user's office 406. In response, the control module 220 may receive the routes 412A, 412B, 412C, 412D (collectively known as 412). The control module 220 may also receive from the mapping application charging locations along the routes 412, the distances along the routes 412, and the electric charge that would be expended on each of the routes 412.

Figure 4C:
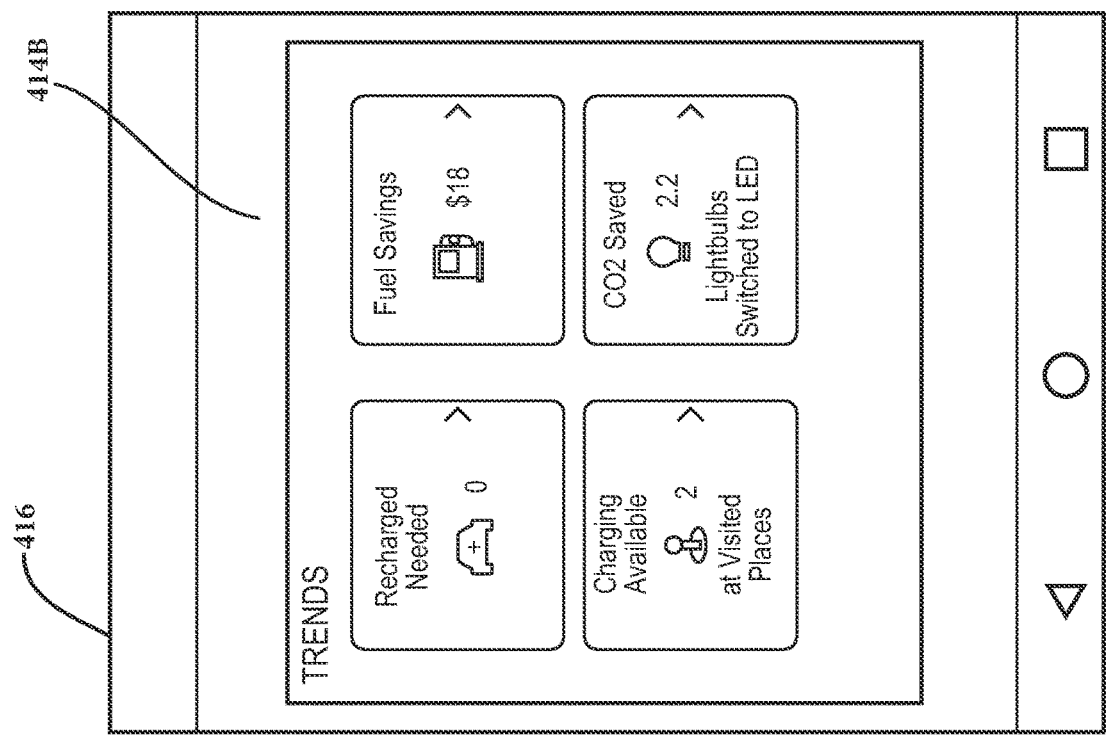
Figure 4B:
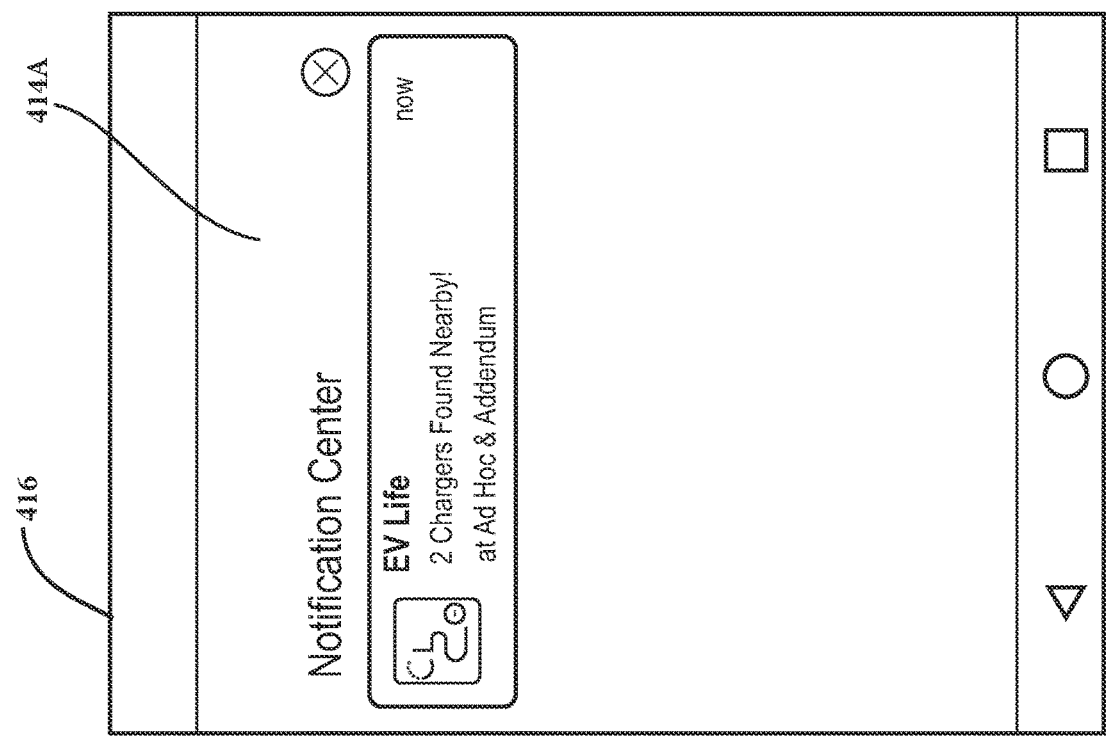

FIGS. 4B-4E illustrate four tabs 414A, 414B, 414C, 414D (collectively known as 414) in a mobile device display 416. As shown in FIGS. 4B-4C, the output module 230 displays information about charging locations proximate to the vehicle 402. More specifically, FIG. 4B shows the output module 230 displaying a summary to the user. In FIG. 4C, the output module 230 displays a list of journeys, whether the hypothetical EV needs to be recharged, and the cost savings difference between the electric charge and the gasoline expended on the trip based on the routes 412. The output module 230 may display the number of charging locations that are proximate to the vehicle 402.

Figure 4E:
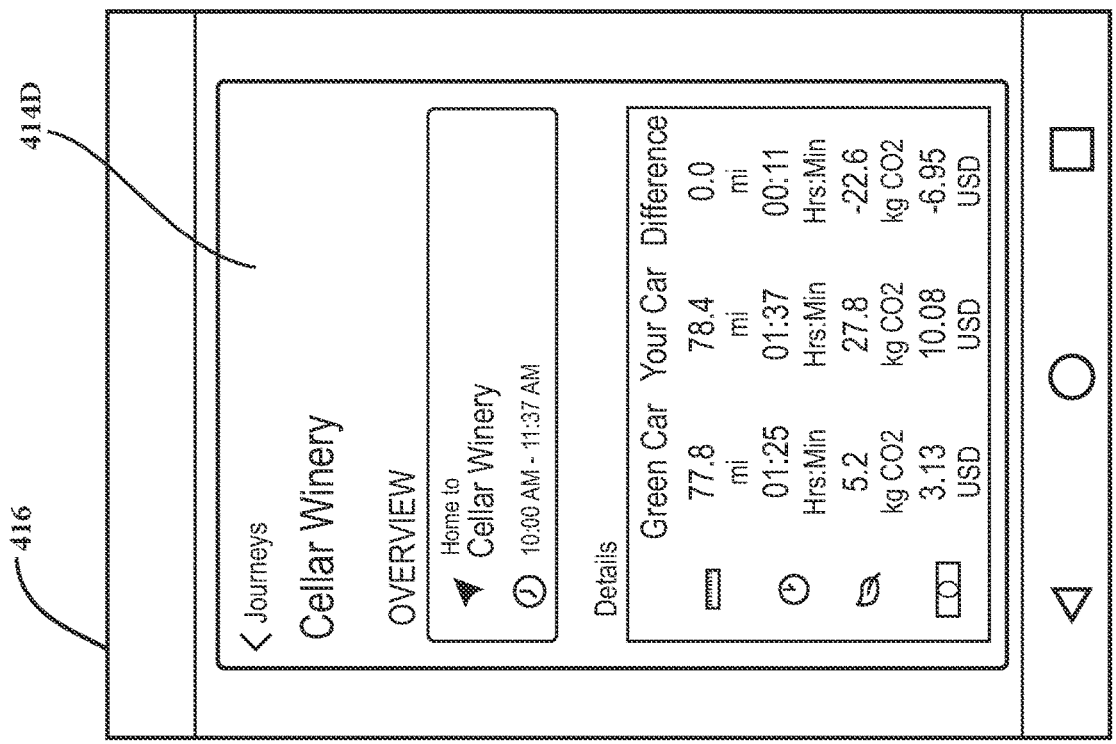
Figure 4D:
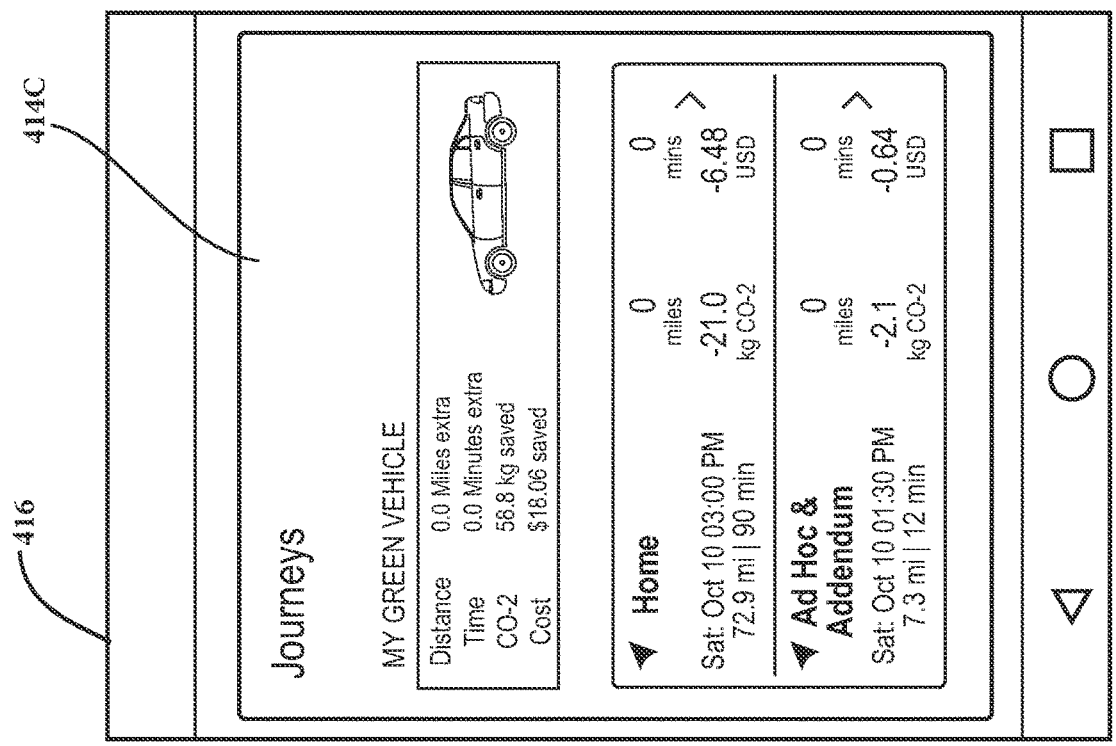

As shown in FIGS. 4D-4E, the output module 230 may display a difference in distance or time travel between the hypothetical EV and the vehicle 402. In FIG. 4E, the output module 230 displays the distances, time, carbon cost, and monetary cost for a trip when travelled by the hypothetical EV and the vehicle 402 as well as the differences.

FIG. 1 will now be discussed in full detail as an example environment within which the system and methods disclosed herein may operate. The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 215 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps. The terrain map(s) can include information about the ground, terrain, roads, surfaces, and/or other features of one or more geographic areas. The terrain map(s) can include elevation data in the one or more geographic areas. The map data 116 can be high quality and/or highly detailed.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more environment sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, a tracking system 148, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other objects in the external environment of the vehicle 100, such as, for example, lane markers, signs, traffic lights, traffic signs, lane lines, crosswalks, curbs proximate the vehicle 100, off-road objects, electronic roadside devices, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors, one or more LIDAR sensors, one or more sonar sensors, and/or one or more cameras. In one or more arrangements, the one or more cameras 226 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system, a braking system, a steering system, throttle system, a transmission system, a navigation system 147, and/or a tracking system 148. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The tracking system 148 can include one or more devices, applications, and/or combinations thereof, now or later developed, configured to determine the geographic location of the vehicle 100 and/or the positioning of the vehicle relative to surrounding infrastructure and landmarks. The tracking system 148 can include one or more mapping applications to determine the positioning of the vehicle 100. The tracking system 148 can include a global positioning system, a local positioning system or a geolocation system.

The processor(s) 110 and/or the hypothetical EV system 170 can be operatively connected to communicate with the various vehicle systems 140 and/or individual components thereof. For example, returning to FIG. 1, the processor(s) 110 and/or the hypothetical EV system 170 can be in communication to send and/or receive information from the various vehicle systems 140 to determine locations such as the origin and the destination of the journey, the speed of travel, and/or proximate charging locations.

The vehicle 100 can include one or more modules, at least some of which are described herein. The modules can be implemented as computer-readable program code that, when executed by a processor 110, implements one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4 but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising:
   identifying an origin and a destination of a non-electric vehicle after the non-electric vehicle has arrived at the destination;
   estimating energy information for a hypothetical electric vehicle traveling from the origin to the destination, the energy information including an electric charge consumption amount; and
   outputting the energy information to a user.

2. The method of claim 1, wherein the energy information further includes at least one of a remaining electric charge amount, a monetary amount, a carbon emission amount, a charging location, a distance, a route, or a travel time.

3. The method of claim 1, further comprising
determining a notification criteria; and
outputting the energy information to the user based on the notification criteria.

4. The method of claim 1, wherein the estimating the energy information for the hypothetical electric vehicle traveling from the origin to the destination includes:
determining one or more routes suitable for the hypothetical electric vehicle to travel from the origin to the destination; and
determining the energy information for the hypothetical electric vehicle when the hypothetical electric vehicle travels on at least one of the one or more routes.

5. The method of claim 1, further comprising:
determining one or more routes suitable for the hypothetical electric vehicle to travel from the origin to the destination;
identifying one or more charging locations on the one or more routes; and
outputting the one or more charging locations to the user.

6. The method of claim 1, further comprising:
in response to determining that the non-electric vehicle has arrived at the destination, identifying one or more charging stations proximate to the destination; and
updating an electric charge of the hypothetical electric vehicle based on a time spent by the non-electric vehicle at the destination.

7. The method of claim 1, further comprising:
determining that the destination is a final destination for a day.

8. A system comprising:
one or more processors; and
a memory in communication with the one or more processors, the memory including:
a control module including instructions that when executed by the one or more processors cause the one or more processors to:
identify an origin and a destination of a non-electric vehicle after the non-electric vehicle has arrived at the destination; and
estimate energy information for a hypothetical electric vehicle traveling from the origin to the destination, the energy information including an electric charge consumption amount; and
an output module including instructions that when executed by the one or more processors cause the one or more processors to:
output the energy information to a user.

9. The system of claim 8, wherein the energy information further includes at least one of a remaining electric charge amount, a monetary amount, a carbon emission amount, a charging location, a distance, a route, or a travel time.

10. The system of claim 8, wherein the output module further includes instructions that when executed by the one or more processors cause the one or more processors to:
determine a notification criteria; and
output the energy information to the user based on the notification criteria.

11. The system of claim 8, wherein the estimating the energy information for the hypothetical electric vehicle traveling from the origin to the destination includes:
determining one or more routes suitable for the hypothetical electric vehicle to travel from the origin to the destination; and
determining the energy information for the hypothetical electric vehicle when the hypothetical electric vehicle travels on at least one of the one or more routes.

12. The system of claim 8, wherein the control module further includes instructions that when executed by the one or more processors cause the one or more processors to:
determine one or more routes suitable for the hypothetical electric vehicle to travel from the origin to the destination; and
identify one or more charging locations on the one or more routes; and
wherein the output module further includes instructions that when executed by the one or more processors cause the one or more processors to:
output the one or more charging locations to the user.

13. The system of claim 8, wherein the control module further includes instructions that when executed by the one or more processors cause the one or more processors to:
in response to determining that the non-electric vehicle has arrived at the destination, identify one or more charging stations proximate to the destination; and
update an electric charge of the hypothetical electric vehicle based on a time spent by the non-electric vehicle at the destination.

14. The system of claim 8 wherein the control module further includes instructions that when executed by the one or more processors cause the one or more processors to:
determine that the destination is a final destination for a day.

15. A non-transitory computer-readable medium including instructions that, when executed by one or more processors, cause the one or more processors to:
identify an origin and a destination of a non-electric vehicle after the non-electric vehicle has arrived at the destination;
estimate energy information for a hypothetical electric vehicle traveling from the origin to the destination, the energy information including an electric charge consumption amount; and
output the energy information to a user.

16. The non-transitory computer-readable medium of claim 15, wherein the energy information further includes at least one of a remaining electric charge amount, a monetary amount, a carbon emission amount, a charging location, a distance, a route, or a travel time.

17. The non-transitory computer-readable medium of claim 15, wherein the instructions include instructions to:
determine a notification criteria; and
output the energy information to the user based on the notification criteria.

18. The non-transitory computer-readable medium of claim 15, wherein the instructions to estimate the energy information for the hypothetical electric vehicle traveling from the origin to the destination include instructions to:
determine one or more routes suitable for the hypothetical electric vehicle to travel from the origin to the destination; and
determine the energy information for the hypothetical electric vehicle when the hypothetical electric vehicle travels on at least one of the one or more routes.

19. The non-transitory computer-readable medium of claim 15, wherein the instructions include instructions to:
determine one or more routes suitable for the hypothetical electric vehicle to travel from the origin to the destination;
identify one or more charging locations on the one or more routes; and
output the one or more charging locations to the user.

20. The non-transitory computer-readable medium of claim 15, wherein the instructions include instructions to:

in response to determining that the non-electric vehicle has arrived at the destination, identify one or more charging stations proximate to the destination; and
update an electric charge of the hypothetical electric vehicle based on a time spent by the non-electric vehicle at the destination.

\* \* \* \* \*